US007190874B1

(12) United States Patent
Barth et al.

(10) Patent No.: US 7,190,874 B1
(45) Date of Patent: Mar. 13, 2007

(54) FIBER DEMARCATION BOX WITH CABLE MANAGEMENT

(75) Inventors: Michael Barth, Bloomington, MN (US); Soutsada Vongseng, Chanhassen, MN (US); Matthew D. Ferris, Carver, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/243,529

(22) Filed: Oct. 3, 2005

(51) Int. Cl.
*G02B 6/00* (2006.01)

(52) U.S. Cl. .................................. 385/135; 385/134
(58) Field of Classification Search ................ 385/135, 385/134, 147
See application file for complete search history.

(56) References Cited

U.S. PATENT DOCUMENTS

| 5,189,723 | A | 2/1993 | Johnson et al. |
| 5,274,731 | A | 12/1993 | White |
| 5,497,444 | A | 3/1996 | Wheeler |
| 5,717,810 | A | 2/1998 | Wheeler |
| 5,734,776 | A | 3/1998 | Puetz |
| 5,758,003 | A | 5/1998 | Wheeler et al. |
| 6,418,262 | B1 * | 7/2002 | Puetz et al. ................. 385/134 |
| 6,532,332 | B2 | 3/2003 | Solheid et al. |
| 6,591,051 | B2 | 7/2003 | Solheid et al. |
| 6,983,095 | B2 * | 1/2006 | Reagan et al. .............. 385/135 |
| 2004/0264873 | A1 | 12/2004 | Smith et al. |
| 2005/0002633 | A1 | 1/2005 | Solheid et al. |
| 2005/0281526 | A1 | 12/2005 | Vongseng et al. |
| 2006/0093301 | A1 | 5/2006 | Zimmel et al. |
| 2006/0127028 | A1 | 6/2006 | Beck |
| 2006/0165365 | A1 * | 7/2006 | Feustel et al. .............. 385/135 |

OTHER PUBLICATIONS

U.S. Appl. No. 11/095,033, filed Mar. 31, 2005 entitled "Adapter Block Including Connector Storage," 55 pages.
U.S. Appl. No. 11/137,855, filed May 25, 2005 entitled "Outside Plant Fiber Distribution Enclosure with Radial Arrangement," 43 pages.
U.S. Appl. No. 11/138,063, filed May 25, 2005 entitled "Fiber Optic Splitter Module," 60 pages.
U.S. Appl. No. 11/138,889, filed May 25, 2005 entitled "Fiber Optic Adapter Module," 57 pages.
"Outside Plant Cross-Connect Solutions," *ADC Telecommunications, Inc.*, pp. 339-341 (Jun. 2004).

(Continued)

*Primary Examiner*—Frank G. Font
*Assistant Examiner*—Guy G. Anderson
(74) *Attorney, Agent, or Firm*—Merchant & Gould P.C.

(57) ABSTRACT

A telecommunications optical fiber distribution system is disclosed. The system comprises a support structure with an upper end, a lower end, a front side, a rear side, and a longitudinal axis. An input cable carrying an input signal and an output cable carrying an output signal is received into the system through the lower end. A plurality of signal splitters located at the upper end of the support structure split the input signal into a plurality of secondary signals. The system includes a plurality of adapters arranged radially about the longitudinal axis along the front side of the support structure. The adapters connect the secondary signals to the output signal. A cable management structure having portions located both along the front side between the plurality of adapters and the splitters and adjacent the back side manage and direct cables going from the input opening to the splitters and from the splitters to the adapters.

20 Claims, 11 Drawing Sheets

OTHER PUBLICATIONS

"Outside Plant FiberSeal System 96 Installation Instructions," *ADC Telecommunications, Inc.*, ADCP-93-079, Issue 3, pp. 1-25 (Aug. 2000).

"Radiator II. Above Ground HDSLx 16-Slot Repeater Housing," *ADC Telecommunications, Inc.*, 2 pages (Nov. 2004).

"Radiator II. Below Gound HDSLx 8-Slot Repeater Housing," *ADC Telecommunications, Inc.*, 2 pages (Jan. 2004).

"Radiator II 8-Slot Repeater Housing User Manual," *ADC Telecommunications, Inc.*, pp. i-viii, 1-20 (Jan. 14, 2004).

* cited by examiner

FIBER DEMARCATION BOX WITH CABLE MANAGEMENT

FIELD

The present invention relates generally to provision of optical fiber telecommunications service. More specifically, the present invention relates to cable management in a fiber distribution system.

BACKGROUND

Outside plant (OSP) telecommunications equipment, including terminations and splitters, may be housed in protective enclosures out of doors. The enclosures may be above-ground. Below-ground solutions are known which store the equipment in a below-ground vault. The vault is typically accessible through a top door.

As demand for telecommunications services increases, optical fiber services are being extended into more and more areas. Often, it is more cost effective to provide for greater service capacity than current demand warrants. This will allow a telecommunications service provider to quickly and cost-effectively respond to future growth in demand. Often, optical fiber cables may be extended to a customer's premises prior to that customer actually requesting or needing service. Such cables may be extended to premises adjacent the premises of a current customer, as it may be cost effective to extend both cables at the same time, or the cables may be extended to new building sites in anticipation of the new occupants of those sites requesting fiber optic service.

Therefore, it is desirable to have a scalable solution for aiding connection of new customers to existing connections within a piece of installed connection equipment and expansion of the number of connections available within the installed equipment. It is also desirable to provide for a scalable connection solution that can provide for a high density of connections while using little space, that limits visual pollution, and that is reliable and serviceable. In the case of below-ground vault storage, it is desirable that the equipment be readily accessible as needed by the service technician.

SUMMARY

The present invention relates to a fiber optic telecommunications distribution system and the management of telecommunications cables.

An input fiber optic signal, carried by an input cable, after being split into secondary signals by splitters, is directed to a cable management area. From the cable management area, the split signals can be directed to adapters for connection with customer equipment or output cables if service is desired. If service is not yet desired, the split signal cables can be directed to an excess connector storage area where connectors terminating these cables are stored and protected until a connection by the customer is desired. The adapters connecting the split signal cables to customer equipment cables are housed in radially arranged adapter modules, which are outwardly slidably movable for gaining access to the connections.

According to one embodiment of the invention, an optical fiber distribution system includes a support structure with an upper end, a lower end, a front side, a rear side, and a longitudinal axis. An input cable carrying an input signal is received through a first opening located adjacent the lower end of the support structure and an output cable carrying an output signal is received through a second opening located adjacent the lower end of the support structure. At least one fiber optic splitter located adjacent the upper end of the support structure splits each input signal into a plurality of secondary signals. The distribution system includes a plurality of adapters arranged radially about the longitudinal axis adjacent the front side of the support structure. The adapters connect the secondary signals to the output signal. A cable management structure having portions located both adjacent the front side of the support structure between the plurality of adapters and the splitters and adjacent the back side of the support structure manage and direct cables going from the first opening to the splitters and from the splitters to the adapters.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

DETAILED DESCRIPTION

Reference will now be made in detail to examples of inventive aspects of the present disclosure which are illustrated in the accompanying drawings. Wherever possible, the same reference numbers will be used throughout the drawings to refer to the same or like parts.

Referring to FIGS. 1–9, a fiber optic telecommunications distribution system 100 having examples of inventive aspects in accordance with the present disclosure is illustrated.

Figure 3:
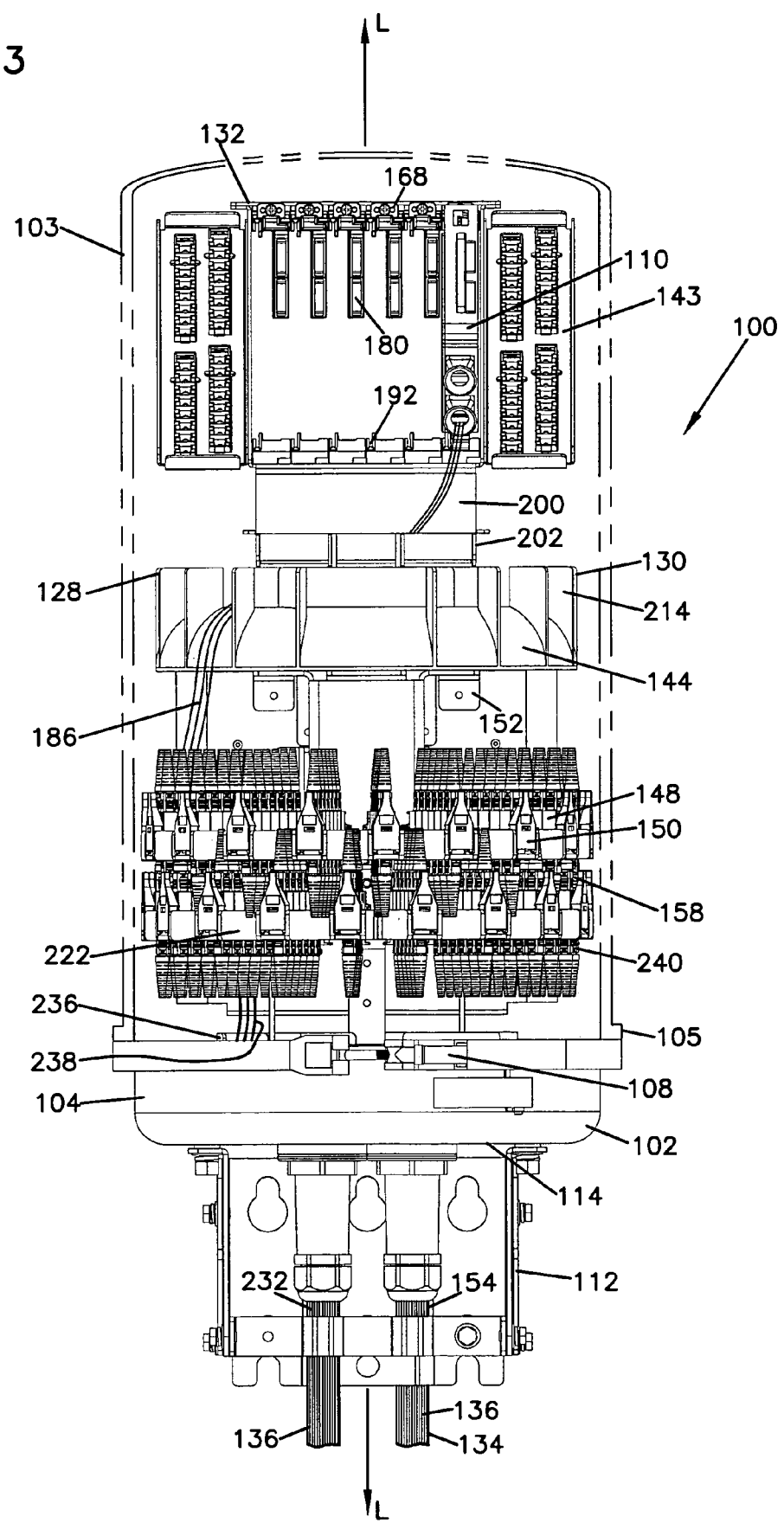
FIG. 3 is a front elevational view of the fiber optic distribution system of FIG. 1.
Figure 4:
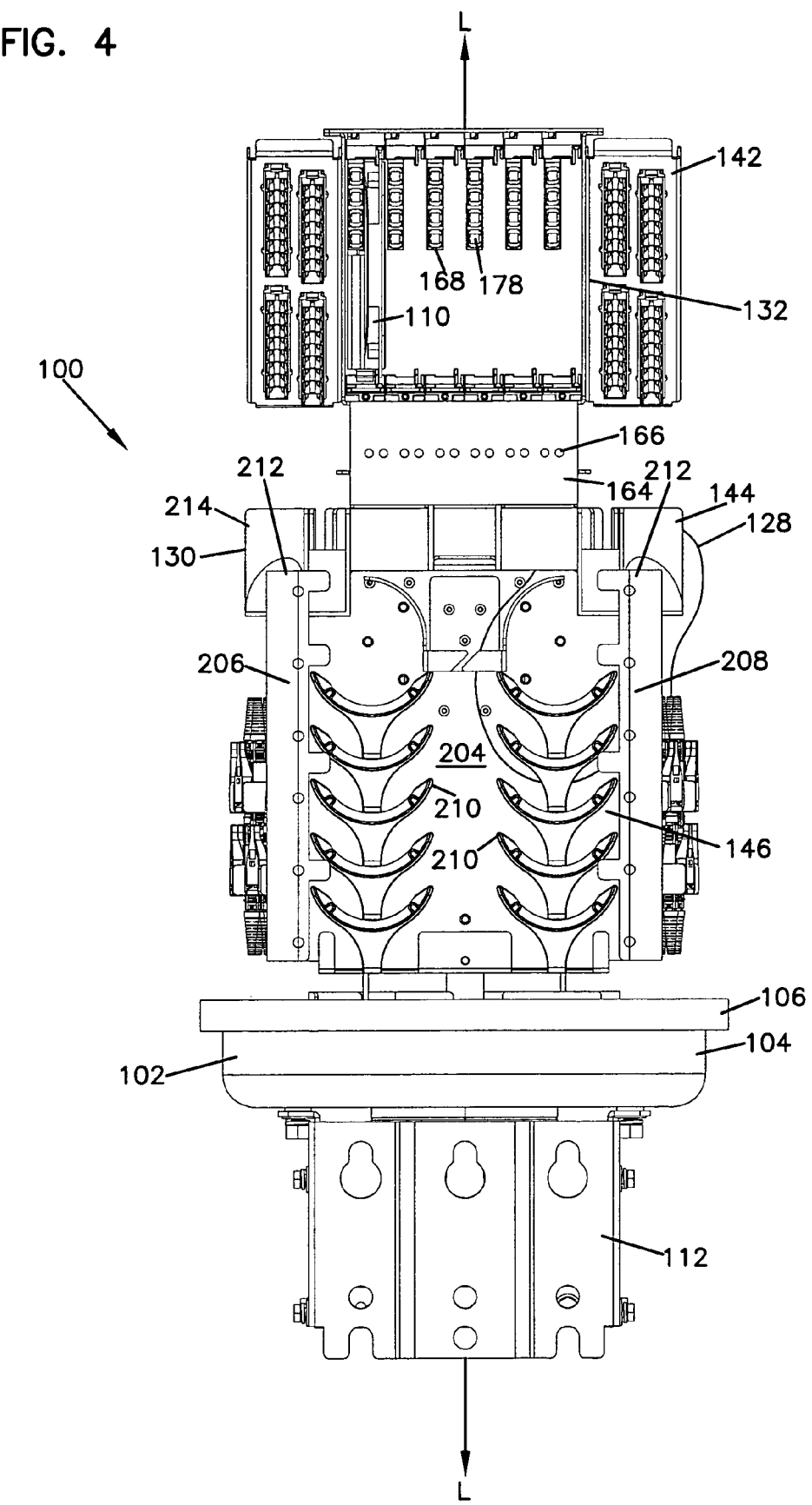
FIG. 4 is a rear elevational view of the fiber optic distribution system of FIG. 1.

Fiber optic distribution system 100 is sealed by an enclosure 102 that is defined by a base tray 104 and a cover 103 (shown in dashed lines in FIG. 3). In the FIGS., fiber optic telecommunications distribution system 100 is shown with the cover 103 of enclosure 102 removed, exposing the inner components of distribution system 100. A cover similar to the cover that is adapted for use with fiber optic distribution system 100 is shown and described in commonly owned U.S. patent application Ser. No. 11/137,855, filed May 25, 2005, the entire disclosure of which is hereby incorporated by reference.

Fiber optic distribution system 100 may be mounted in an underground vault. The underground vault might be located in an area where fiber optic connectivity for customers is desired. It should be appreciated that the inventive aspects of the disclosure are applicable to above-ground as well as below-ground applications.

Cover 103 and base tray 104 include mating abutting flanges 105, 106, respectively that are shaped for receiving a V-clamp 108 with an O-ring for forming a water-tight seal. Such clamps are commonly known in the art. In this manner, any water that might be present in an underground vault housing distribution system 100 does not reach the inner components of system 100. In addition, trapped air within the can/bell-jar type sealed enclosure 102 prevents any water in the vault from rising to the level of the splitter modules 110, which are preferably located toward the top of system 100. The clamping arrangement between base tray 104 and the cover is described in further detail in U.S. patent application Ser. No. 11/137,855. It should be noted that a V-clamp/O-ring arrangement is one of the many possible sealing techniques that may be used to form a sealed enclosure for distribution system 100.

Base tray 104 of enclosure 102 includes a mounting bracket 112 attached to bottom side 114 of base tray 104. Mounting bracket 112 is used to mount enclosure 102 to a sidewall of an underground vault or to a similar structure. Mounting bracket 112 is formed from two interfitting U-shaped plates 116, 118. First U-shaped plate 116 fixedly attaches fiber distribution system 100 to a sidewall while second U-shaped plate 118 pivots with respect to first U-shaped plate 116 to tilt enclosure 102 away from the sidewall. In this manner, service persons can access portions of fiber optic telecommunications distribution system 100 that are located adjacent the sidewall. A mounting bracket similar to mounting bracket 112 is described in further detail in U.S. patent application Ser. No. 11/137,855.

Referring generally to FIGS. 1–9, fiber optic distribution system 100 includes a top end 120, a bottom end 122, a front side 124, a rear side 126, a right side 128 and a left side 130. Fiber optic distribution system 100 defines a longitudinal axis L. Adjacent top end 120, fiber optic distribution system 100 includes a splitter housing 132 (i.e., splitter chassis or splitter bank). Splitter housing 132 houses a plurality of splitter modules 110 that split an incoming optical signal carried through an input cable 134 (i.e., a feeder cable, an outside plant cable, or an OSP cable) into a plurality of secondary signals to be distributed through an output cable 136 going to customer locations. Mounted on each side 138, 140 of splitter housing 132 is an excess connector storage structure 142. Excess connector storage structure 142 is utilized as a temporary storage space for customers that may not yet be ready to receive fiber optic service.

Figure 8:
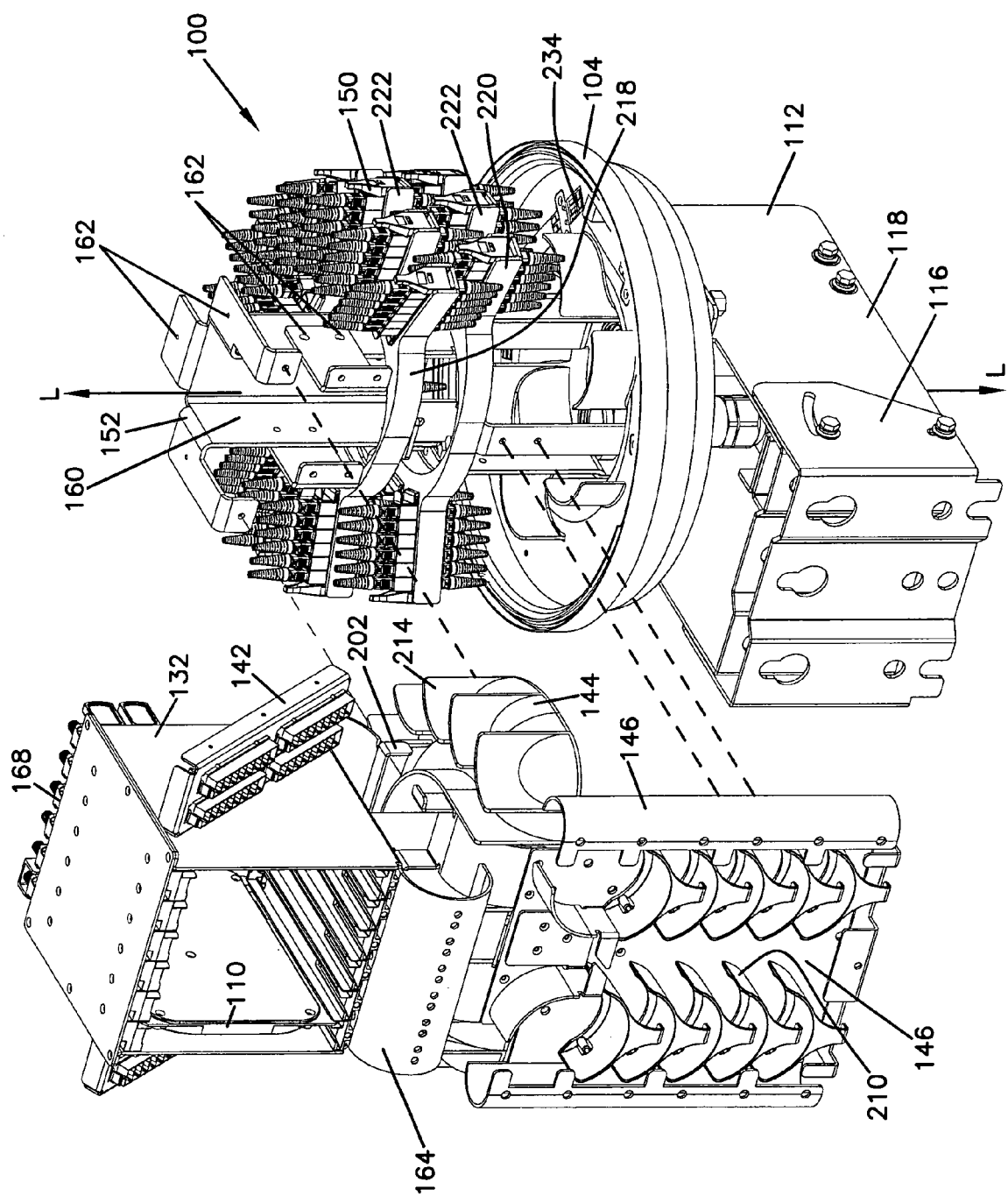
FIG. 8 is a rear perspective view of the fiber optic distribution system of FIG. 1, the distribution system shown with a splitter housing, an excess connector storage structure, a vertical cable management structure, and a horizontal cable management structure separated from a support frame of the fiber optic distribution system, the splitter housing, the excess connector storage structure, the vertical cable management structure, and the horizontal cable management structure shown assembled together.
Figure 9:
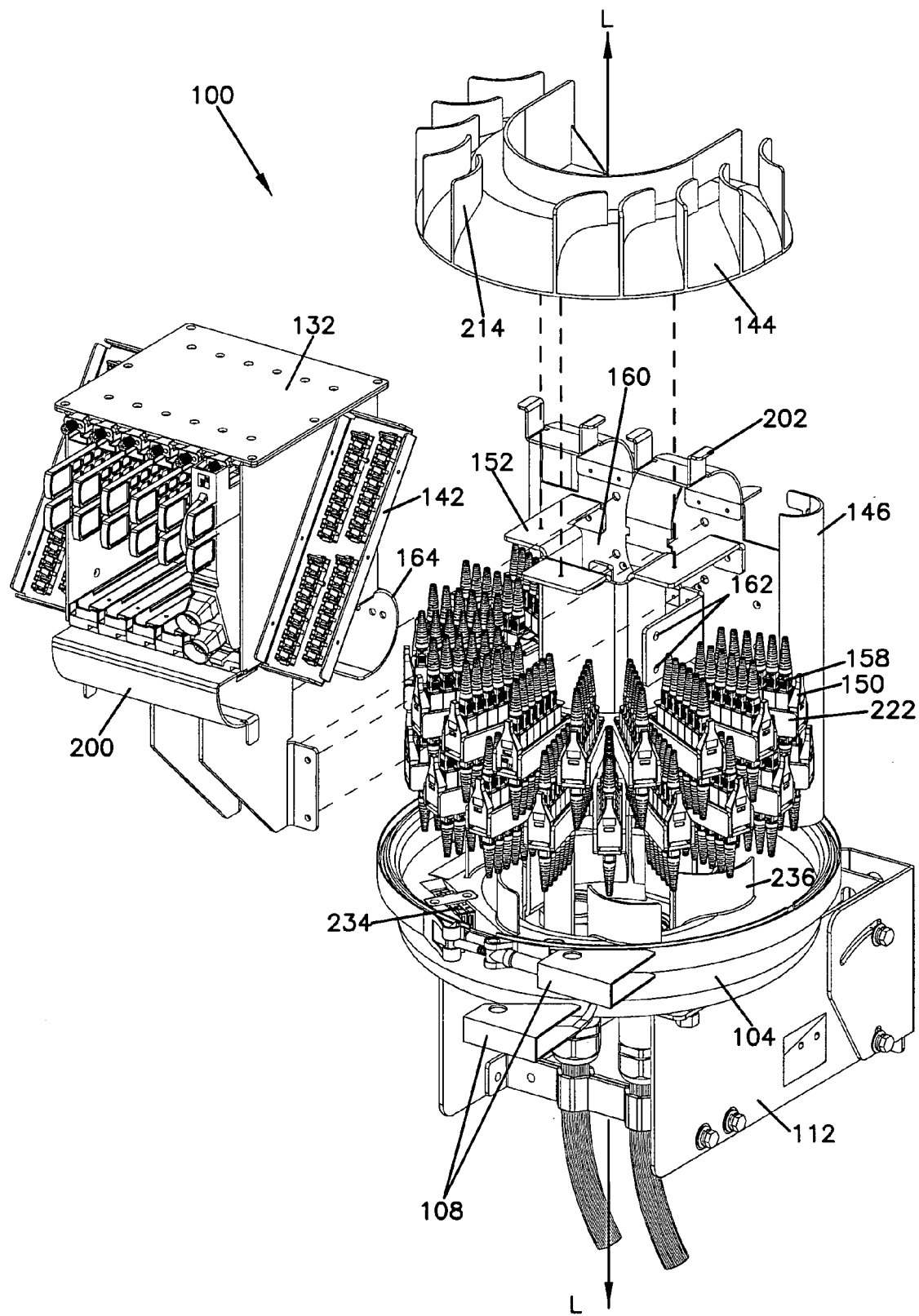
FIG. 9 is a front perspective view of the fiber optic distribution system of FIG. 1, the distribution system shown with the splitter housing, the excess connector storage structure, and the horizontal cable management structure separated from the support frame of the fiber optic distribution system, the horizontal cable management structure shown separate and the splitter housing and the excess connector storage structure shown assembled together.

Directly below splitter housing 132, fiber optic distribution system 100 includes a horizontal cable management structure 144 that is located at front side 124 of fiber optic distribution system 100. Located below splitter housing 132 at rear side 126 of fiber optic distribution system 100 is a vertically extending cable management structure 146. Cable management structures 144, 146, respectively, manage and direct the split input signals coming from splitters 110 to a plurality of adapters 148 located below horizontal cable management structure 144 in front side 124 of system 100. Adapters 148 are provided in six-pack adapter modules 150 that are arranged radially generally along front side 124 of system 100. Adapter modules 150 are constructed such that they can be slid out radially for gaining access to the individual connections. Adapters 148 of adapter modules 150 interconnect the split input signals with the output distribution signals. The internal components of fiber optic distribution system 100 are generally mounted on a center support frame 152 extending upwardly from base tray 104. In FIGS. 8 and 9, distribution system 100 is shown with a number of the internal components of system 100 removed to expose support frame 152.

Fiber optic distribution system 100 depicted in FIGS. 1–9 provides a distribution and cable management system that provides a scalable solution for aiding connection of new customers to existing connections within a piece of installed connection equipment and expansion of the number of connections available within the installed equipment. Fiber optic distribution system 100 provides a location for outside plant fiber optic signals to be split and connected to customer equipment signals to provide fiber optic service and connectivity at the customer's location.

In distribution system 100 shown in FIGS. 1–9, a multi-fiber input cable 134 (i.e., an outside plant cable, a feeder cable, an OSP cable) enters distribution system 100 through an opening 154 at bottom side 114 of base tray 104 (see FIGS. 1–3 and 7–9). Preferably, a sealing arrangement is formed at cable entry opening 154 at bottom side 114 of base tray 104. The individual cables 156 of multi-fiber input cable 134 are preferably terminated with connectors 158. In the illustrated embodiment, such cable terminating connectors 158 are of an SC type configuration. It is anticipated that other types, formats, styles and sizes of telecommunications connectors may be used.

Individual connectorized input cables 156 are directed upwardly through the center of support frame 152. Support frame 152 defines a space 160 in the center of system 100 for accommodating individual input cables 156 extending from base tray 104 to splitter housing 132. As shown in FIGS. 8 and 9, support frame 152 includes holes 162 for mounting the individual internal components of fiber distribution system 100 to support frame 152 with fasteners.

Figure 2:
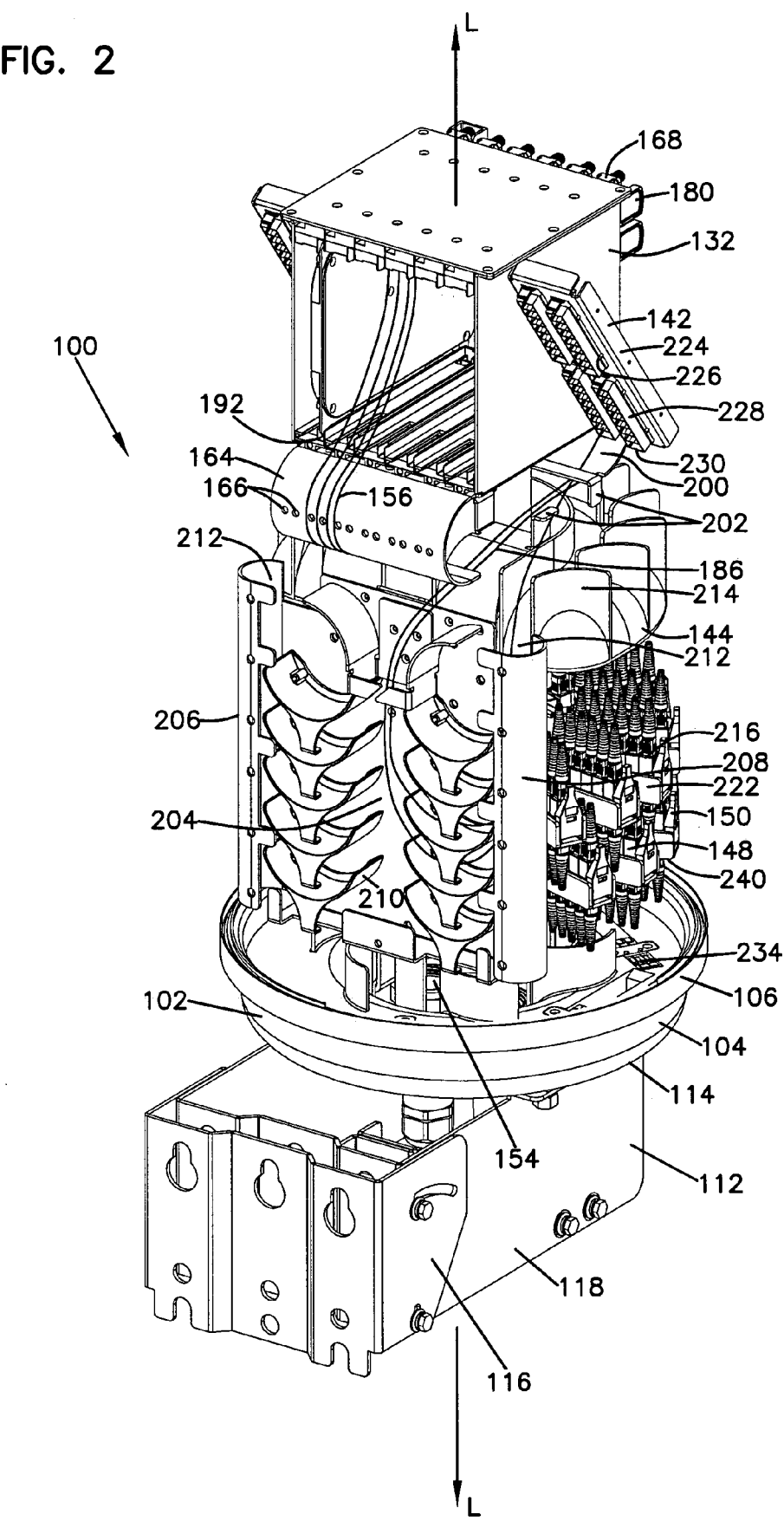
FIG. 2 is rear perspective view of the fiber optic distribution system of FIG. 1.

After individual input cables 156 are directed upwardly within support frame 152, they are guided around a rear radius limiter 164 into splitter housing 132 (see FIG. 2). Rear radius limiter 164 includes holes 166 for accommodating cable tie down structures (not shown) for managing cables 156. Within splitter housing 132, individual connectorized cables 156 are connected to adapter assemblies 168 located within splitter housing 132.

Figure 11:
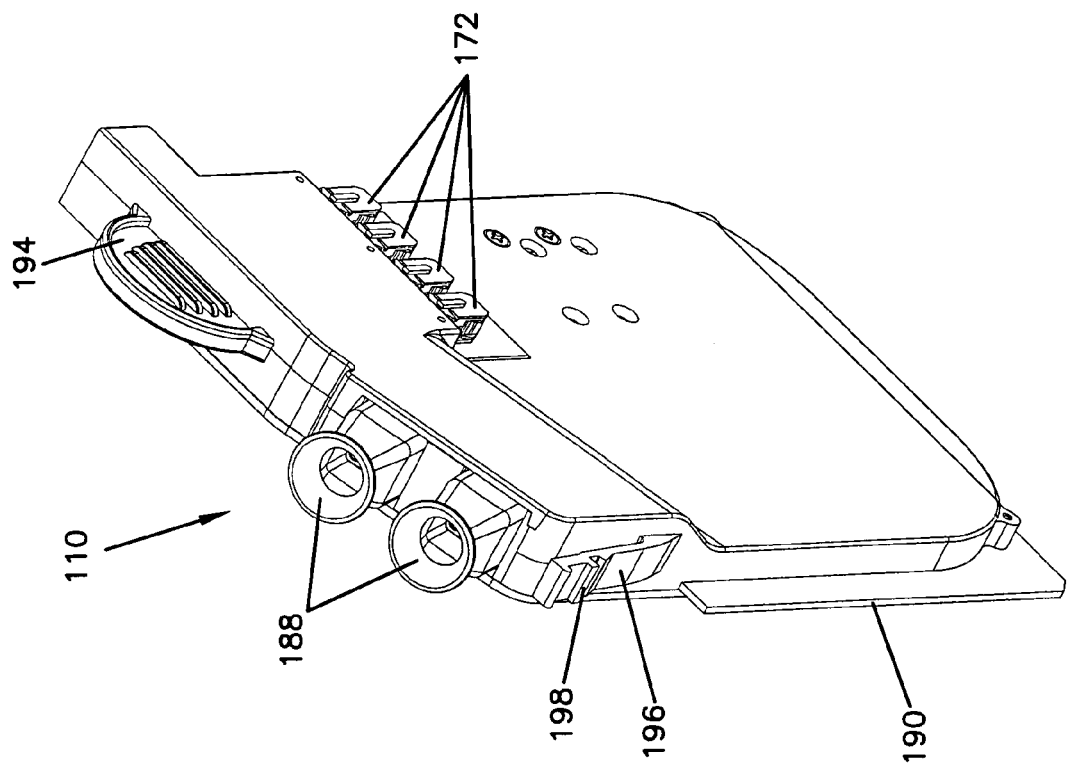
FIG. 11 is a perspective view of a splitter module of the fiber optic distribution system of FIG. 1.
Figure 12:
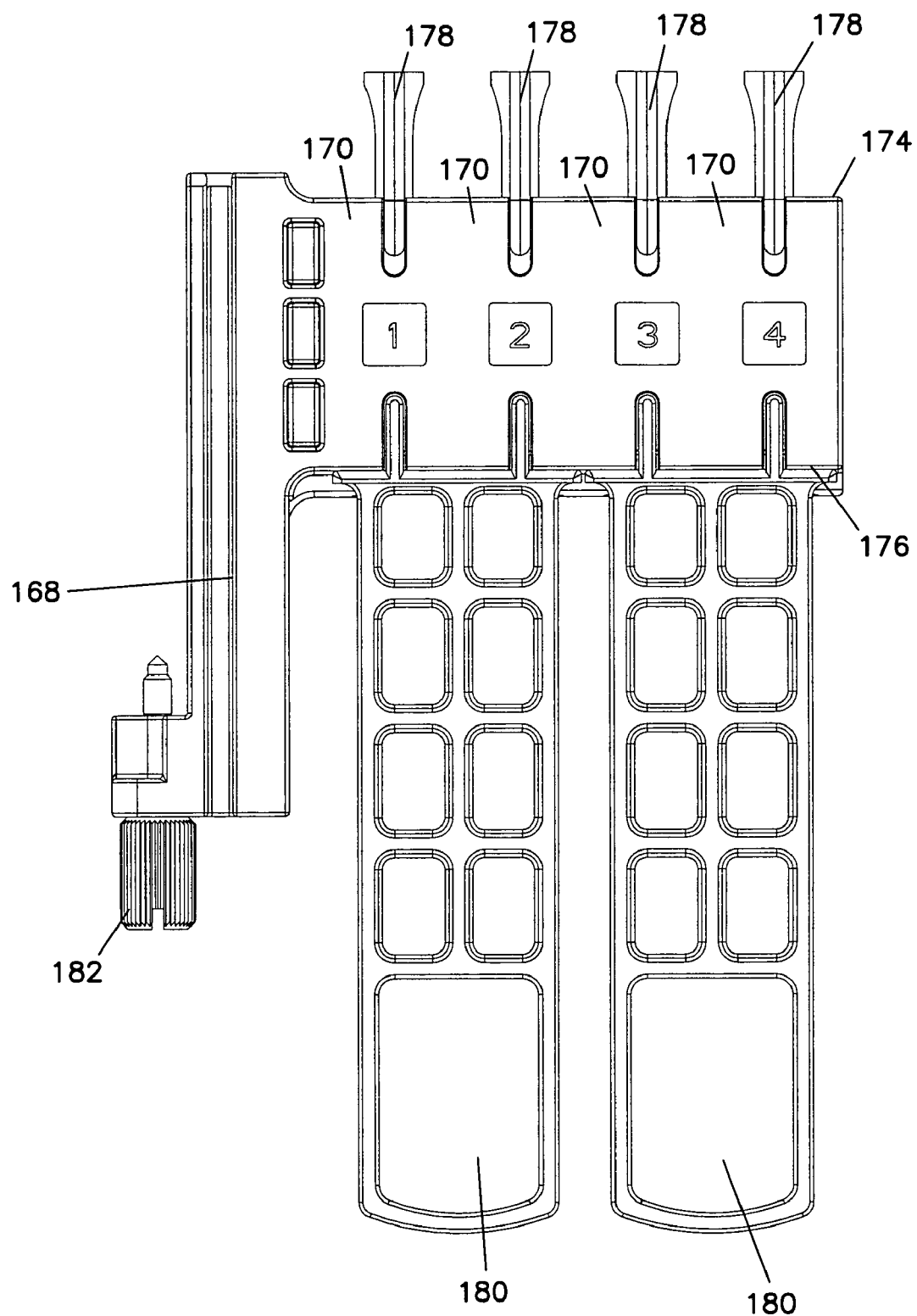
FIG. 12 is a side view of an adapter assembly of the fiber optic distribution system of FIG. 1, the adapter assembly being configured to mate with input connectors of the splitter module of FIG. 11, the adapter assembly shown with four dust plugs and two extended dual dust plugs mounted on opposing ends thereof.

One of the adapter assemblies 168 is shown in FIG. 12. An adapter assembly 168 includes four integrated adapters 170 for connecting input cables 156 to input connectors 172 (see FIG. 11) of each splitter module 110. Each adapter 170 has a rear end 174 and a front end 176. Adapter assembly 168 is shown in FIG. 12 with a dust plug 178 positioned in rear end 174 of each adapter 170 and an extended dual dust plug 180 inserted within front ends 176 of each pair of adapters 170 to seal the interior of adapters 170 from contaminants. Adapter assemblies 168 are mounted on splitter housing 132 with mounting screws 182. Adapter assemblies 168 are positioned and arranged such that when a splitter module 110 is slidably inserted into splitter housing 132, input connectors 172 of splitter modules 110 plug into adapters 170 of adapter assemblies 168. Dust plugs 178, 180 are utilized when there is not a splitter module 110 connected to an adapter assembly 168.

One of the splitter modules 110 is shown in FIG. 11. Splitter module 110 includes four input connectors 172 that extend along the module body. In other embodiments, other number of splitter inputs can be utilized. The four input connectors 172 are adapted to be connected to adapters 170 of adapter assembly 168. Once the signal is input into splitter module 110 through input connectors 172, each signal is split into thirty-two signals by internal splitter circuitry within splitter module 110. This type of a splitter configuration is called a 1×32 splitter. It should be noted that other splitter configurations such as a 2×16 splitter, a 1×16 splitter, etc., could be used in other embodiments depending upon the desired service. Split signal cables (i.e., secondary cables) 186 are then directed out of outputs 188 of splitter module 110. In the embodiment shown, each splitter module 110 includes two outputs 188 and each output 188 is constructed to accommodate sixteen split signal cables 186. Other numbers are also contemplated. Split signal cables 186 are also preferably terminated with connectors 158.

Splitter modules 110 include guide flanges 190 for slidably guiding splitter modules 110 into guide slots 192 formed within splitter housing 132. A handle 194 is provided for facilitating slidable insertion and removal of splitter modules 110 from splitter housing 132. A cantilever arm 196 with tabs 198 is provided on splitter modules 110 for fixedly locking splitter modules 110 within housing 132 with a snap-fit arrangement. If access to splitter modules 110 is desired, cantilever arm 196 can be elastically flexed and module 110 slid horizontally out of splitter housing 132.

Splitter modules and adapter assemblies similar to those shown herein are described in greater detail in commonly owned U.S. patent application Ser. Nos. 10/980,978, filed Nov. 3, 2004; Ser. No. 11/138,063, filed May 25, 2005; and Ser. No. 11/138,889 filed May 25, 2005, the entire disclosures of which are hereby incorporated by reference.

Figure 1:
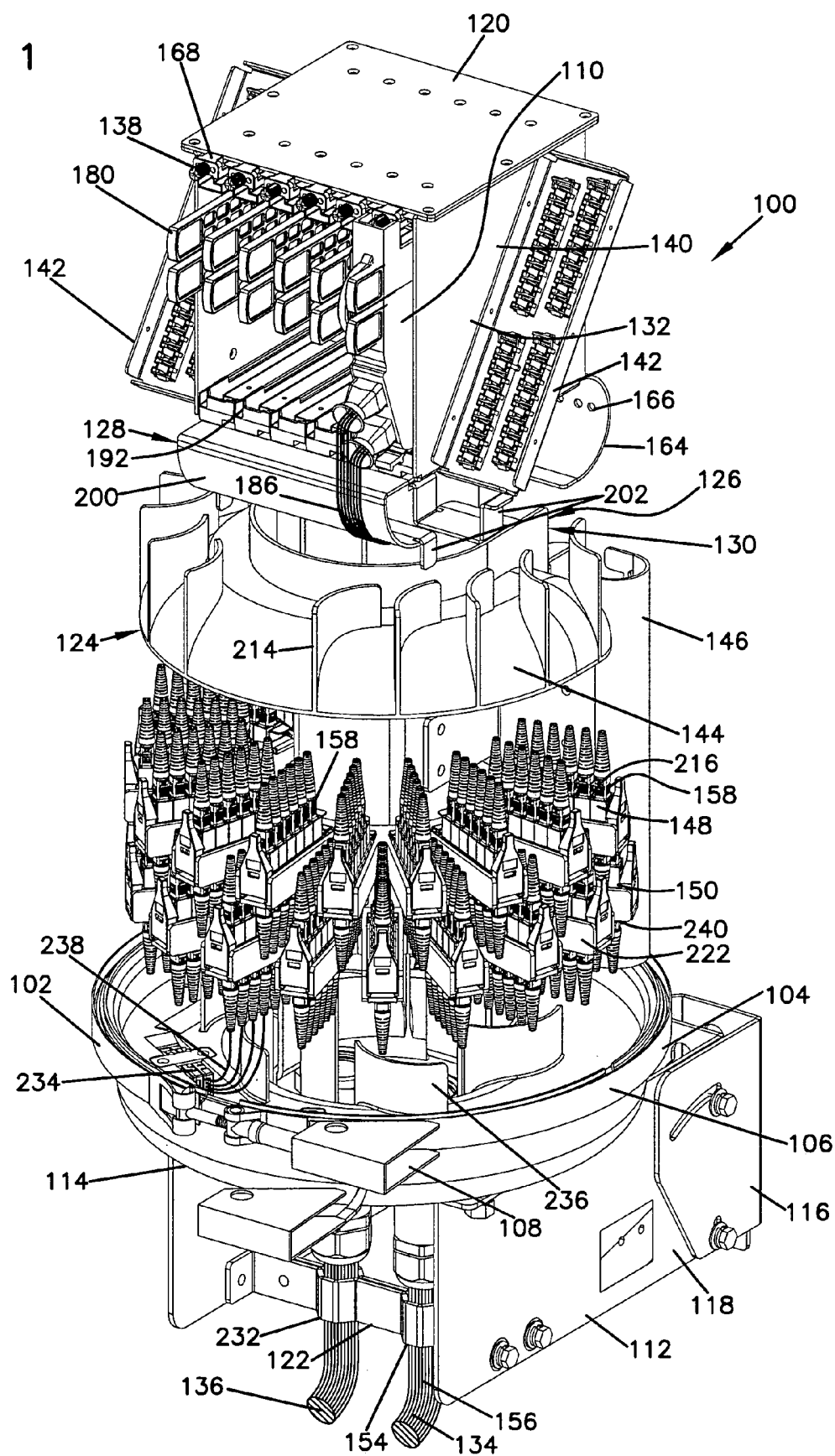
FIG. 1 is a front perspective view of a fiber optic distribution system, the distribution system shown with a cover of an enclosure of the distribution system removed to provide access to inner components of the system.
Figure 5:
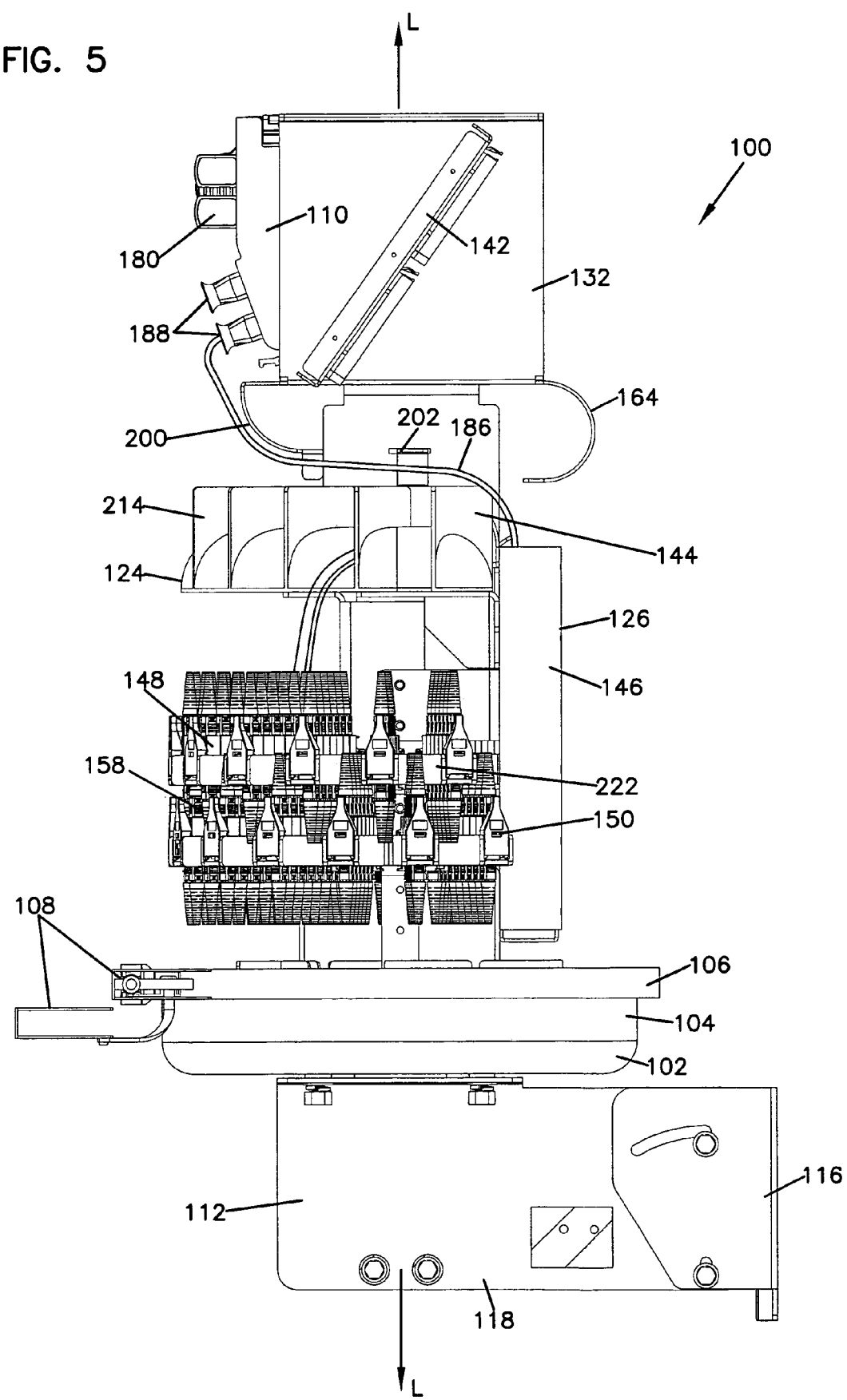
FIG. 5 is a left side elevational view of the fiber optic distribution system of FIG. 1.
Figure 6:
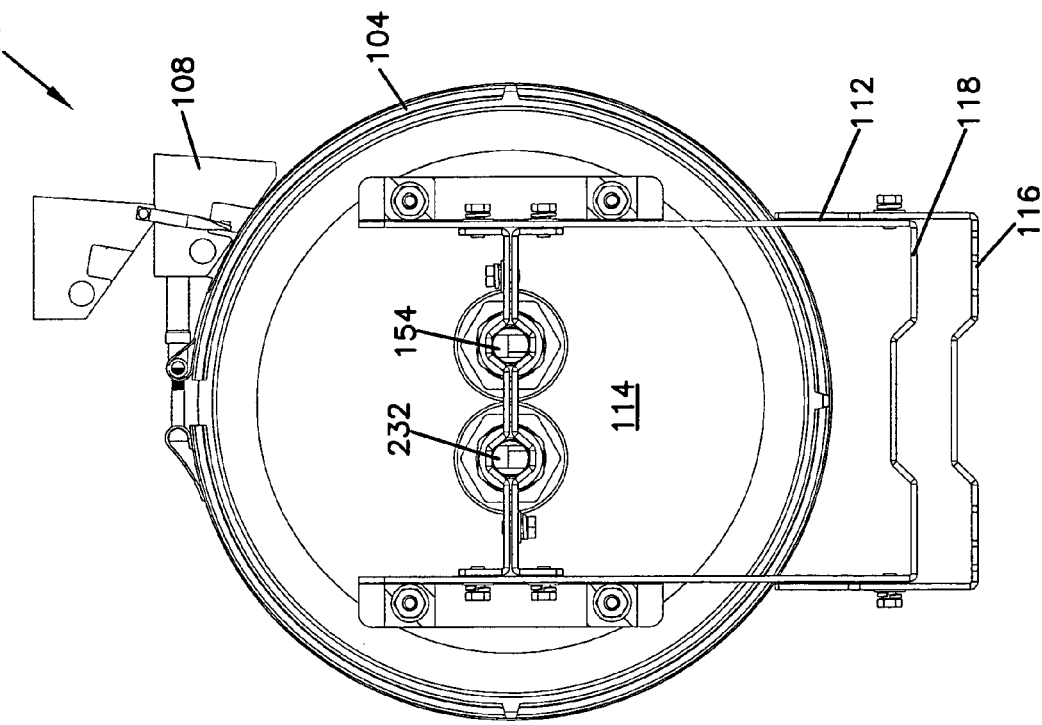
FIG. 6 is a top plan view of the fiber optic distribution system of FIG. 1.
Figure 7:
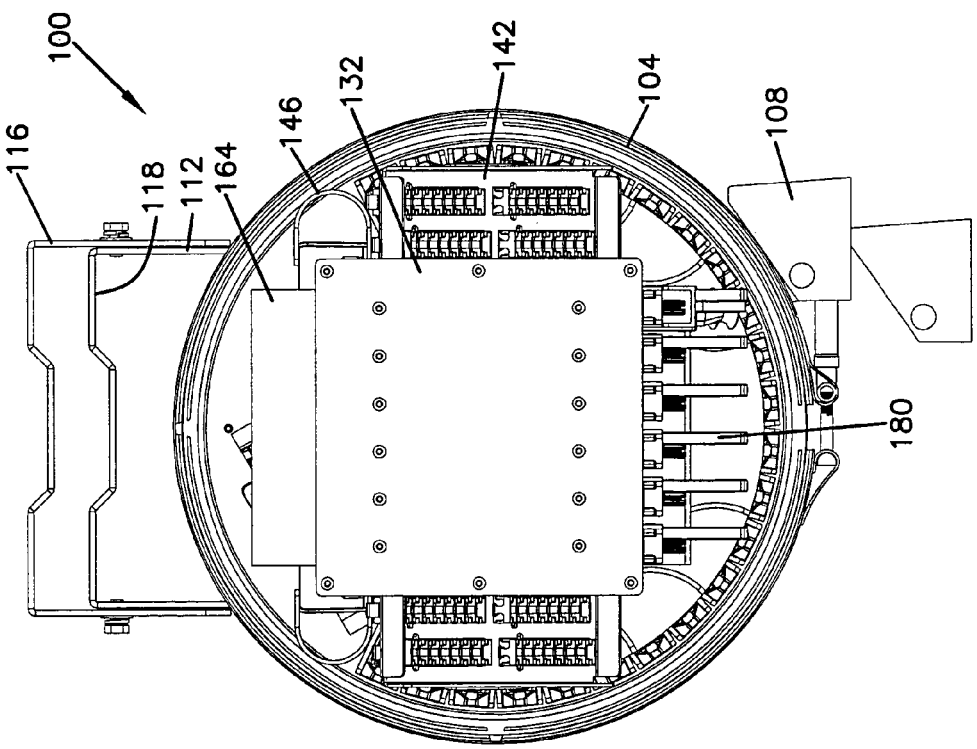
FIG. 7 is a bottom plan view of the fiber optic distribution system of FIG. 1.
Figure 10:
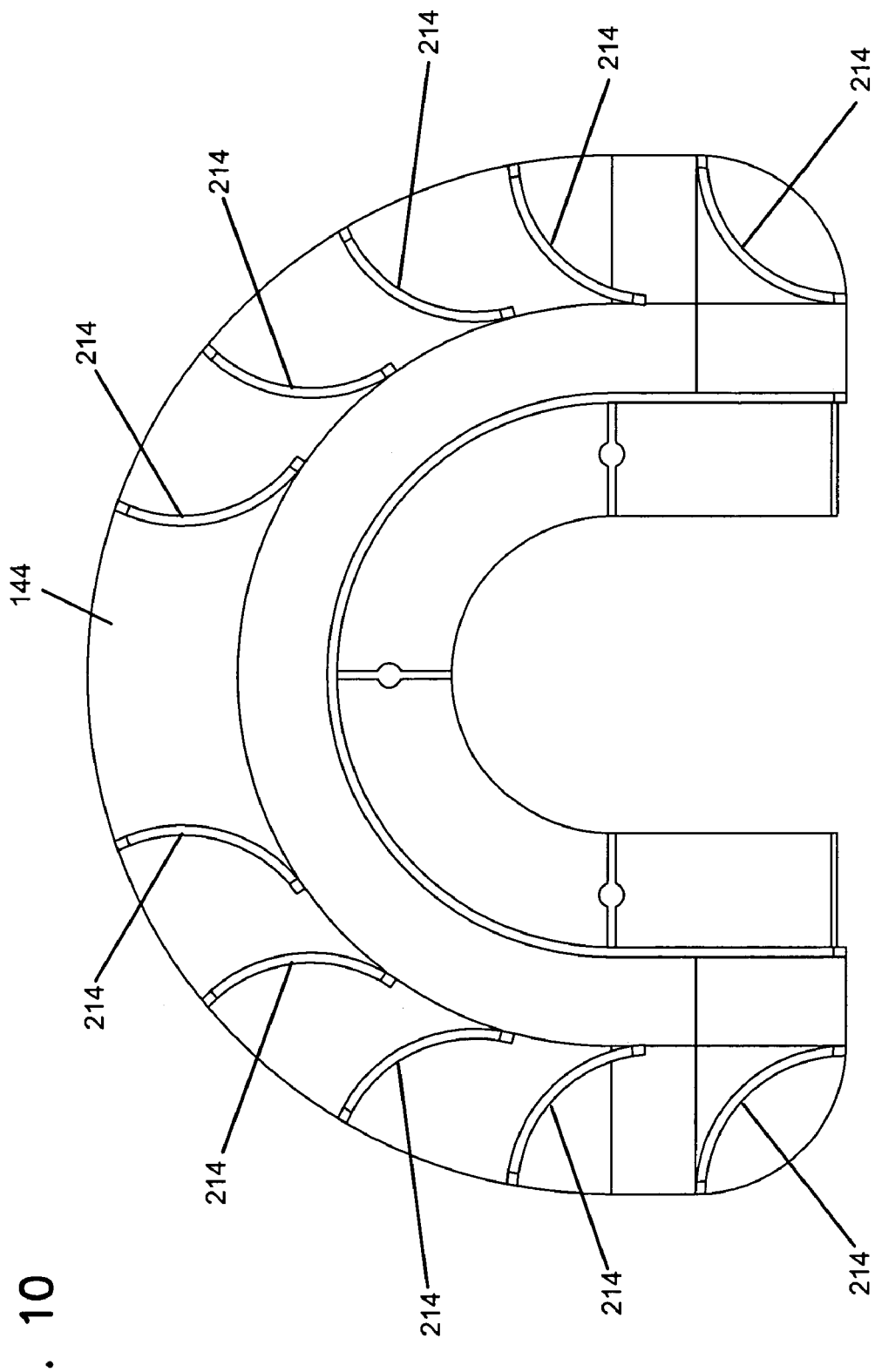
FIG. 10 is a top plan view of the horizontal cable management structure of the fiber optic distribution system of FIG. 1.

Once split signal cables 186 leave outputs 188 of splitter modules 110, they are directed around a front radius limiter 200 toward rear side 126 of fiber distribution system 100 (see FIGS. 1 and 5). Going from front radius limiter 200 to rear side 126, cables 186 are directed through a set of cable management fingers 202 located between front radius limiter 200 and rear radius limiter 164. Once cables 186 are directed to vertical cable management structure 146, cables 186 are guided down a center lane 204 of vertical cable management structure 146 (see FIGS. 2 and 4). From center lane 204, split signal cables 186 are directed either to the right side 206 or the left side 208 of cable management structure 146 and are wrapped around vertical spools 210 to be directed upwardly along sides 212 of cable management structure 146. Once cables 186 reach the top of vertical cable management structure 146, they are cascaded around horizontal radius limiters 214 to adapter modules 150. As illustrated in FIG. 10, horizontal radius limiters 214 are formed as part of a C-shaped (i.e., horse-shoe shaped) horizontal cable management structure 144. Cables 186 are connected upper ends 216 of adapters 148 housed in radially arranged adapter modules 150.

Fiber distribution system 100 includes two layers of radially arranged adapter modules 150. Each layer of adapter modules 150 is mounted on adapter module mounts 218 that form a part of support frame 152. Adapter module mounts 218 provide structural support for and allow for slidability of adapter modules 150. Adapter module mounts 218 have radial extensions 220 that form guides or walls 222 for slidably receiving adapter modules 150. Adapter modules 150 are radially slidable between a retracted position and an extended position. The slidability of adapter modules 150 facilitates access to adapters 148 and the corresponding cable connectors 158 therein. Similar sliding adapter modules are described in greater detail in commonly owned U.S. Pat. Nos. 5,497,444; 5,717,810; and 6,591,051, the disclosures of which are hereby incorporated by reference.

The two adjacently positioned adapter module mounts 218 are configured such that the two layers of adapter modules 150 are positioned in an offset orientation with respect to each other, allowing for increased density. In the embodiment of fiber distribution system 100 depicted in the FIGS., each mount 218 is configured to support twelve adapter modules 150, with the two layers totaling twenty-four adapter modules 150. Each adapter module 150 is configured to hold six adapters 148. Thus, fiber optic telecommunications distribution system 100, as depicted, is able to accommodate a total of one hundred and forty-four distribution connections. Other numbers are also contemplated.

For those customers that are not yet ready to receive fiber optic service, a number of the split signal cables 186 may be directed to an excess connector storage structure 142 located on sides 138, 140 of splitter module housing 132, rather than adapters 148. Excess connector storage structure 142 includes a bulkhead 224 that defines mounting slots 226 for mounting connector holders 228. Each connector holder 228 may include a plurality of openings 230 for receiving and releasably holding fiber optic connectors 158. Openings 230 in connector holders 228 preferably do not provide a continuous optical path but rather house and protect a polished end face of an optical fiber within cable 186. This protection may be provided in combination with an endcap (not shown), such as shown in commonly-owned U.S. patent application Ser. No. 10/610,325, filed on Jun. 30, 2003, the disclosure of which is incorporated herein by reference. Alternatively, a connector holder may enclose and protect the polished end face of the connector terminating cable without the need for a protective endcap. Excess connector storage structure 142 and connector holder 228 are described in greater detail in commonly-owned U.S. patent application Ser. No. 10/871,555, filed on Jun. 18, 2004, the disclosure of which is incorporated herein by reference.

In distribution system 100 shown in FIGS. 1–9, a multi-fiber output cable 136 (i.e., customer equipment cable, distribution cable) enters distribution system 100 through a second opening 232 at bottom side 114 of base tray 104 (see FIGS. 1, 3 and 9). Preferably, a sealing arrangement is also formed at this second cable entry opening 232 at bottom side 114 of base tray 104. In one embodiment, multi-fiber output cable 136 may be formed from a plurality of twelve-cable ribbon cables. In certain embodiments, output cable 136 may include twelve such ribbon cables for a total of one hundred and forty-four distribution signals.

As shown in FIGS. 1, 2, 8, and 9, fiber optic distribution system includes fan-outs 234 and output cable radius limiters located within base tray 104. Once multi-fiber output cable 136 enters enclosure 102 through base tray 104, the individual ribbon cables are routed around radius limiters 236 toward the outer perimeter of base tray 104 and are separated into individual distribution cables 238 (see FIG. 3) by fan-outs 234. Individual distribution cables 238 are also preferably terminated with connectors 158. In the illustrated embodiment, such cable terminating connectors 158 are SC type connectors. Once terminated with connectors 158, individual distribution cables 238 are connected to lower ends 240 of adapters 148 of adapter modules 150. In this manner, distribution cables 238 can be interconnected to split signal cables 186 that are connected to upper ends 216 of adapters 148 in adapter modules 150 to provide fiber optic connectivity to customers. For those customers who were not ready to receive service previously but are now ready, connectorized split signal cables 186 that are stored in excess connector storage structure 142 can be removed from excess connector storage structure 142 and can be connected to upper ends 216 of adapters 148 to provide a connection with distribution cables 238.

It should be noted that for ease of illustration and description, only a fraction of the total number of cables, the total number of splitters, the total number of fan-outs, etc. utilized in distribution system 100 are shown in the FIGS.

It should also be noted that, although in the foregoing description of the fiber distribution system 100, terms such as "upper", "lower", "front", "rear", "right", and "left" have been used for ease of description and illustration, no restriction is intended by such use of the terms. The fiber optic distribution system 100 can be positioned in any orientation.

Having described the preferred aspects and embodiments of the present invention, modifications and equivalents of the disclosed concepts may readily occur to one skilled in the art. However, it is intended that such modifications and equivalents be included within the scope of the claims which are appended hereto.

The invention claimed is:

1. An optical fiber distribution system, comprising:
    a support structure with an upper end, a lower end, a front side, a rear side, and a longitudinal axis;
    a first opening located adjacent the lower end of the support structure, the first opening being for receiving an input cable carrying an input signal and a second opening located adjacent the lower end of the support structure, the second opening being for receiving an output cable carrying an output signal;
    a fiber optic splitter located adjacent the upper end of the support structure, the fiber optic splitter configured to split the input signal into a plurality of secondary signals;
    a plurality of adapters arranged generally radially about the longitudinal axis adjacent the front side of the support structure, each adapter including a first connection end for receiving a connector terminated to a cable carrying one of the secondary signals, each adapter also including a second connection end for receiving a connector terminated to the output cable;
    a first cable management structure located adjacent the front side of the support structure between the plurality of adapters and the splitter; and
    a second cable management structure located adjacent the back side of the support structure, the first and second cable management structures being for directing a cable going from the splitter to an adapter of the plurality of adapters.

2. An optical fiber distribution system according to claim 1, further comprising a plurality of splitters housed in a splitter housing, the splitters being slidably insertable and removable from the splitter housing.

3. An optical fiber distribution system according to claim 2, wherein the plurality of splitters are slidably insertable and removable from the splitter housing in a direction extending generally between the front side and the rear side of the support structure.

4. An optical fiber distribution system according to claim 2, wherein each splitter of the plurality of splitters includes a flexible cantilever arm with a tab for providing a snap-fit connection with the splitter housing.

5. An optical fiber distribution system according to claim 1, further comprising an excess connector storage structure for storing a cable carrying one of the secondary signals coming from the splitter that is not connected to an adapter, the excess connector storage structure providing a termination location for a cable without providing a continuous optical path for one of the secondary signals.

6. An optical fiber distribution system according to claim 1, wherein the first cable management structure includes a plurality of radius limiters that are arranged generally radially about the longitudinal axis adjacent the front side of the support structure.

7. An optical fiber distribution system according to claim 1, wherein the second management structure includes a plurality of radius limiters in a stacked arrangement parallel to the longitudinal axis adjacent the rear side of the support structure.

8. An optical fiber distribution system according to claim 1, wherein the input cable, the cable carrying one of the secondary signals, and the output cable are terminated with SC type connectors.

9. An optical fiber distribution system according to claim 1, further comprising two stacked layers of adapters arranged generally radially about the longitudinal axis adjacent the front side of the support structure.

10. An optical fiber distribution system according to claim 9, wherein the two stacked layers of adapters are radially offset with respect to each other such that the adapters on a bottom layer of adapters do not axially align with the adapters on a top layer.

11. An optical fiber distribution system according to claim 1, wherein the plurality of adapters are housed in adapter modules, the adapters modules being movable generally radially outwardly from the longitudinal axis.

12. An optical fiber distribution system according to claim 9, wherein each of the two layers of adapters includes seventy-two adapters, wherein the adapters are housed in radially arranged modules having six adapters each.

13. A support structure for a fiber optic distribution system, comprising:
    a generally circular base tray including a first cable management structure, the base tray including a first opening for receiving an input cable and a second opening for receiving an output cable;
    a center support structure extending from the base tray, the center support structure defining a longitudinal axis and including a front side, a rear side, an upper end and a lower end;
    an adapter mount mounted to the center support structure, the adapter mount including mounting locations for mounting adapters in a radial arrangement with respect to the longitudinal axis generally along the front side of the center support structure;

a splitter housing mounted adjacent the upper end of the center support structure, the splitter housing including guide slots for slidably receiving splitter modules;

a second cable management structure located between the adapter mount and the splitter housing, the second cable management structure including a plurality of radius limiters arranged generally radially about the longitudinal axis generally along the front side of the center support structure;

a third cable management structure located adjacent the rear side of the center support structure, the third cable management structure including a plurality of radius limiters in a stacked arrangement parallel to the longitudinal axis.

14. A support structure according to claim 13, wherein the adapter mount includes mounting locations for mounting two stacked layers of adapters arranged generally radially about the longitudinal axis adjacent the front side of the center support structure.

15. A support structure according to claim 13, further comprising an excess connector storage structure for storing a cable carrying a fiber optic signal, the excess connector storage structure providing a termination location for the cable without providing a continuous optical path for the fiber optic signal.

16. A support structure according to claim 13, wherein the center support structure defines a space for accommodating cables extending between the base tray and the splitter housing located adjacent the upper end of the center support structure.

17. An optical fiber distribution system, comprising:
a support structure with an upper end, a lower end, a front side, a rear side, and a longitudinal axis;
a first opening located adjacent the lower end of the support structure, the first opening being for receiving an input cable carrying an input signal and a second opening located adjacent the lower end of the support structure, the second opening being for receiving an output cable carrying an output signal;
a plurality of fiber optic splitters located adjacent the upper end of the support structure, each fiber optic splitter configured to split the input signal into a plurality of secondary signals, each fiber optic splitter including an input location for receiving a connector terminated to the input cable and an output location for outputting a cable carrying one of the secondary signals;
a plurality of adapters arranged generally radially about the longitudinal axis adjacent the front side of the support structure, each adapter including a first connection end for receiving the connector terminated to the cable carrying one of the secondary signals, each adapter also including a second connection end for receiving a connector terminated to the output cable;
an excess connector storage structure for storing a cable carrying one of the secondary signals coming from the splitters that is not connected to an adapter, the excess connector storage structure providing a termination location for a cable without providing a continuous optical path for one of the secondary signals;
a first cable management structure located adjacent the back side of the support structure, the first cable management structure including a plurality of radius limiters in a stacked arrangement parallel to the longitudinal axis of the support structure, the first cable management structure being for directing a cable going from the output location of the splitters to either an adapter of the plurality of adapters or to the excess connector storage structure; and a second cable management structure located adjacent the front side of the support structure between the plurality of adapters and the splitter, the second cable management structure including a plurality of radius limiters that are arranged generally radially about the longitudinal axis of the support structure, the second cable management structure being for directing a cable going from the first cable management structure to an adapter of the plurality of adapters.

18. A fiber distribution system wherein the plurality of adapters and the plurality of fiber optic splitters are housed in modules that are slidably movable in a horizontal direction generally perpendicular to the longitudinal axis of the support structure.

19. A method of managing cables within a fiber distribution system that includes a support structure with an upper end, a lower end, a front side, a rear side, and a longitudinal axis, the method comprising the steps of:
directing an input cable carrying an input fiber optic signal to an input location of a fiber optic splitter, the fiber optic splitter configured to split the input fiber optic signal into a plurality of secondary signals;
directing a cable carrying one of the secondary signals from an output location of the fiber optic splitter around a radius limiter from the front side of the support structure toward the rear side of the support structure;
directing the cable carrying one of the secondary signals to a first cable management structure, and, after directing the cable downwardly toward the lower end of the support structure through the first cable management structure, wrapping the cable around a radius limiter of a plurality of vertically stacked radius limiters of the first cable management structure and directing the cable upwardly toward the upper end of the support structure; and
directing the cable carrying one of the secondary signals from the first cable management structure to either an excess connector storage structure located adjacent the upper end of the support structure or to a second cable management structure, wherein a cable directed to the second cable management structure is directed downwardly to an adapter around a radius limiter of a plurality of radius limiters arranged generally radially about the longitudinal axis, the adapter providing a connection location between the cable carrying one of the secondary signals and an output cable.

20. A method according to claim 19, further comprising the steps of:
disconnecting a cable connected to the excess connector storage structure;
storing a slack of the cable created by disconnecting the cable from the excess connector storage structure by unwrapping or wrapping the cable around a radius limiter of the plurality of vertically stacked radius limiters of the first cable management structure; and
directing the cable from the first cable management structure to the second cable management structure and around a radius limiter of the second cable management structure to an adapter.

* * * * *